United States Patent
Yan et al.

[11] Patent Number: 5,995,526
[45] Date of Patent: Nov. 30, 1999

[54] TRANSVERSE ZEEMAN LASER

[75] Inventors: Guang-Yao Yan, Mountain View; John C. Tsai, Saratoga, both of Calif.

[73] Assignee: Excel Precision, Inc., Santa Clara, Calif.

[21] Appl. No.: 09/187,913

[22] Filed: Nov. 6, 1998

Related U.S. Application Data

[60] Provisional application No. 60/064,595, Nov. 6, 1997.

[51] Int. Cl.$^6$ .......................................... H01S 3/00
[52] U.S. Cl. ................... 372/37; 372/105; 372/10
[58] Field of Search ................ 372/37, 10, 105; 350/149

[56] References Cited

U.S. PATENT DOCUMENTS

| | | | |
|---|---|---|---|
| 3,679,288 | 7/1972 | Harris | 350/149 |
| 3,889,207 | 6/1975 | Burgwald et al. | 372/37 |
| 5,589,133 | 12/1996 | Sommargren | 372/37 |

*Primary Examiner*—Leon Scott, Jr.
*Attorney, Agent, or Firm*—Hickman, Stephens & Coleman, LLP

[57] ABSTRACT

The present invention is a laser (12) having a resonator (28) between an output coupling mirror (20) and a high-reflection mirror (26). A photoelastic plate (38) is incorporated in a photoelastic cell (24), or a photoelastic mirror (36) used in place of the high-reflection mirror (26). The photoelastic plate (38) is placed in the resonator (28) and introduces an artificial anisotropy to the laser (12). The photoelastic plate (38) has privileged directions (34), which are aligned with the axes of the artificial anisotropy. A magnetic field (32) is applied transversely to the resonator (28), in alignment with one of the privileged directions (34), to produce two orthogonal linearly polarized frequencies in an output beam (30) with the Zeeman effect.

17 Claims, 2 Drawing Sheets

TRANSVERSE ZEEMAN LASER

CROSS-REFERENCE TO RELATED APPLICATIONS

This application claims priority from U.S. provisional application Ser. No. 60/064,595 filed Nov. 6, 1997, titled Transverse Zeeman Laser, by Guang-Yao Yan and John C. Tsai, and which is hereby incorporated in its entirety.

TECHNICAL FIELD

The present invention relates generally to interferometry used in displacement measurement, and more particularly to the use of Zeeman type lasers with transverse magnetic fields to extend the possible range of such measurement.

BACKGROUND ART

The use of interferometry to measure changes in lengths, distances, and optical paths is well known in industry. Collectively such practice can be termed interferometric displacement measurement. In performing such measurement both homodyne and heterodyne techniques may be used, with the latter having come to be overwhelmingly preferred today. Of present interest are heterodyne techniques using two optical frequencies produced with a single laser device.

In general, in a single mode laser only one frequency of oscillation may be produced. In order to allow more than one frequency to oscillate simultaneously, new boundary conditions have to be introduced into the laser resonator so that more than one gain profile is formed. Each profile then provides gain for a respective polarization of light. The application of a magnetic field to at least part of the laser gain medium is one well known way to accomplish this, and inserting a birefringent material into a laser resonator to create a photoelastic effect producing different optical path lengths for different polarizations of light is another.

When a magnetic field is applied to a single longitudinal mode laser cavity, two oscillation frequencies may be produced which have orthogonal polarizations and are separated in frequency symmetrically with respect to the absolute frequency of the laser (its natural resonant frequency). This is commonly termed the Zeeman effect, and lasers using it are called Zeeman lasers. In a Zeeman laser the magnetic field may be applied along the same direction as the axis of the laser resonator (axially or longitudinally; to avoid confusion with longitudinal mode lasers, "axial" or "axially" are used hereinafter) or perpendicular to the axis of the laser resonator (transversely).

For axial type Zeeman lasers the frequency components produced have opposite circular polarizations and the maximum frequency split is typically a few megahertz, e.g., for He-Ne lasers approximately 4 MHz. [He-Ne lasers are used herein as examples. However it should be appreciated that the Zeeman effect may be obtained in other laser mediums and that the present invention may therefore also use such alternate mediums.] For transverse type Zeeman lasers the frequency components produced have opposite linear polarizations and the maximum frequency split is typically only a few kilohertz, e.g., for He-Ne lasers approximately 300 KHz.

The split dual frequencies obtainable with Zeeman lasers are particularly useful for interferometric displacement measurement using heterodyne techniques. A key benefit is that the Zeeman split is symmetric with respect to the absolute frequency, which can be determined very precisely for the particular laser medium used. It follows that the frequency for each frequency component can also be precisely determined. Zeeman lasers also achieve high signal-to-noise ratios. In interferometric displacement measurement these characteristics permit the interference fringes produced by the motion of a target object to be accurately measured, and the total displacement of the target may then be calculated by integrating the total number of such fringes through time. This method of displacement measuring is accurate and reliable, and has found wide use in industry.

In displacement interferometry the maximum obtainable frequency split imposes a limit on target speed during measurement (velocity=$\lambda/2$* Doppler frequency). For example, if a measurement target object is moved such that the Doppler effect causes a decrease in the frequency split, the measured frequency can decrease all the way to zero and the interferometer can cease to function. For axial He-Ne Zeeman lasers the maximum target movement rate, commonly called the "slew rate", is approximately 1.2 m/sec. For transverse He-Ne Zeeman lasers the maximum slew rate is considerably less (<0.1 m/sec). Today axial He-Ne Zeeman lasers are widely used in industry, but it is becoming increasingly desirable to perform displacement measurement using still higher slew rates.

One way to increase the frequency split produced by Zeeman type lasers is to apply a stronger magnetic field to the laser resonator. However, there are practical limits to this. As the magnetic field is made increasingly strong, a point is reached at which the gain medium starts to behave in a non-linear fashion, and second order Zeeman effects then cause unwanted modes and frequencies to appear. This confuses the detectors used in interferometer systems. Overly strong magnetic fields also push the gain of the media away from the absolute frequency, dramatically decreasing the laser power produced, until the point at which lasing stops entirely. Thus, there is an upper limit to the frequency split obtainable using the Zeeman effect.

The larger frequency split obtainable with axial type Zeeman lasers is the reason they are primarily used in industry today, despite the disadvantage that they produce circularly polarized light. This is a disadvantage in interferometry because linear polarized light is needed. To convert the output of axial type Zeeman lasers to linear polarizations, quarter-wave plates must be used. However, such conversion is never perfect, producing considerable noise that can severely complicate interferometric measurement. This also results in considerable loss in usable beam power. It should be particularly noted that transverse type Zeeman lasers do not suffer from this inherent disadvantage.

Other techniques than the Zeeman effect can also be used to create multiple frequencies for use in interferometry. One well known example is insertion of a birefringent material into a laser cavity to produce a birefringence. However, such other techniques generally also suffer a common shortcoming: they have a minimum obtainable frequency split of approximately 40 MHz, which is simply not practical for use in most current interferometry applications. Thus, current techniques are not able to produce split dual frequencies for interferometry in a range extending from roughly 4 MHz to 40 MHz.

Since the application of an axial magnetic field imposes a limit in the maximum frequency split obtainable, and the addition of birefringence imposes a limit in the minimum frequency split obtainable, it would seem logical that combining these techniques might produce a frequency split with no range limitations. However, there are physical laws adversely affecting such direct combination. When the Zeeman effect is produced by application of an axial magnetic field, the two frequencies produced are circularly polarized. However, since photoelastic birefringence materials can only produce different optical paths for linearly polarized light, this approach does not work. Alternately, when the Zeeman effect is produced by application of transverse magnetic field, the two frequencies produced are linearly polarized, but the natural anisotropy of the laser system produces a whole new set of problems.

Without a magnetic field, there are also two mutually perpendicular axes from the natural anisotropy of the laser itself, and it is the principal axis of this anisotropy which provides the least loss for an electromagnetic wave. Thus one component occurs in the polarization plane parallel to the principal axis, and saturation of the population drives the other component so that its polarization plane is perpendicular to the principal axis. Because the two components of a single longitudinal mode are strongly coupled with each other, the laser output falls within a locking frequency range, which provides linearly polarized light at a single frequency in some circumstances.

In a transverse Zeeman laser, the applied magnetic field defines the orientations for emitting linearly polarized light, namely a $\pi$-component having a polarization plane parallel to the magnetic field and a $\sigma$-component having a polarization plane perpendicular to the magnetic field. [The optical convention of referring to horizontal and vertical polarizations as p- and s-components is not used herein. Instead the physics convention of referring to $\pi$- and $\sigma$-components based upon the direction of the applied field is used, because it avoids confusion with light beam directions.] The polarizations of established light inside a laser are thus not only determined by the applied magnetic field, but also influenced by the natural anisotropy of the laser. The orientation of the linearly polarized laser beam can switch into some directions which are neither the direction of the applied magnetic field, which can easily be controlled, nor the orientations of the anisotropy of the laser, which cannot be controlled. Because it is desirable to use two mutually perpendicular linearly polarized components having a frequency split of several MHz for interferometric measurement, these characteristics of the transverse Zeeman laser prevent it from wide application in present precision measurement applications.

Accordingly, new techniques for achieving split dual frequencies having orthogonal linear polarizations for interferometric measurement are needed, particularly ones which produce frequency splits in the range from 4 MHz to 40 MHz.

DISCLOSURE OF INVENTION

Accordingly, it is an object of the present invention to provide a laser system capable of producing two precisely determinable frequencies which are separated by a few hundreds of kilohertz to a few tens of megahertz, preferably in a manner tunable across such a wide range.

Another object of the invention is to provide a laser system capable of producing two frequencies having controllable orthogonal linear polarizations.

And, another object of the invention is to provide such a laser system meeting the above objectives, yet employing widely used and well understood types of laser equipment, such as that used in conventional He-Ne gas laser systems today.

Briefly, a preferred embodiment of the present invention is a laser having gain medium in a resonator between a coupling mirror and high-reflection mirror. A controllable photoelastic unit provides a variable photoelastic effect creating an artificial anisotropy in the laser resonator, and a magnetic field is applied transversely to the resonator to produce a Zeeman effect. The photoelastic unit exhibits privileged directions affecting production of the photoelastic effect, and the magnetic field is transversely applied along one of these privileged directions to create two orthogonal linearly polarized frequency components in an output beam of light from the laser. Optionally, the natural anisotropy of the laser may be determined, and by suitable orientation of the photoelastic unit combined with the artificial anisotropy.

An advantage of the present invention is that, with appropriate stabilization, it can produce two very precisely determinable frequencies, because it uses the Zeeman effect to produce the frequencies symmetrically about an absolute frequency for the particular gain medium used. For common gain media, such as He-Ne gas, such absolute frequencies have been established to extremely high degrees of precision by appropriate standards organizations.

Another advantage of the invention is that the frequencies produced are tunable across a very wide range of frequency separations. Specifically, using entirely conventional He-Ne gas laser technology, the invention can provide frequency separations in the highly desirable range of 4 MHz to 40 MHz. This permits precision interferometric measurement using measurement target movement rates ("slew rates") which are not possible using prior techniques.

Another advantage of the invention is that the frequencies produced have naturally orthogonal linear polarizations, which greatly facilitates their use in interferometric measurement applications. Since conversion from circular polarization is not needed, the loss of laser power in such conversion is avoided. Noise in the ultimate interferometry application is also avoided, since there is no incomplete conversion (because when conversion is used it is never perfect).

Another advantage of the invention is that the orientations of the orthogonal linear polarizations are controllable, greatly simplifying set-up and use in the ultimate interferometry application.

And, another advantage of the invention is that the polarized frequencies produced may have different intensities, the ratio of which may be adjusted as needed.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
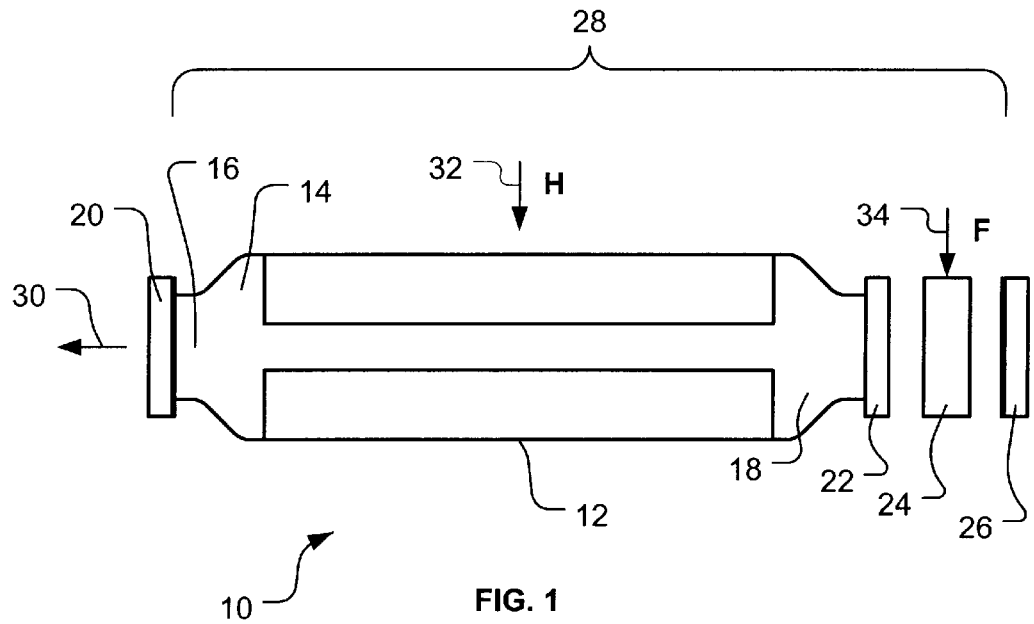
FIG. 1 is a schematic diagram of a configuration for a semi-internal He-Ne laser implementation of the invention.

This invention presents apparatus and method to create two precisely determinable frequencies having a wide and adjustable range of possible frequency differences, and controllable orthogonal linear polarizations. A preferred embodiment of the present invention is a transverse Zeeman laser. As illustrated in the views of FIGS. 1 and 2, preferred embodiments of the invention are depicted by the general reference character 10.

Figure 2:
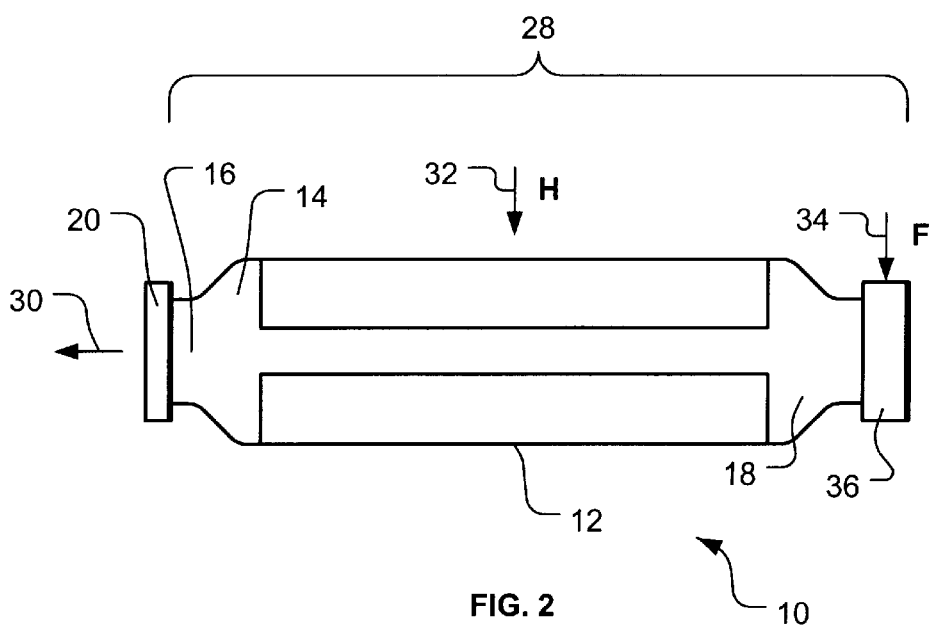
FIG. 2 is a schematic diagram of a configuration for an internal mirror He-Ne laser implementation of the invention.

FIG. 1 is a schematic illustrating a first preferred embodiment of the inventive transverse Zeeman laser 10. Included are a He-Ne laser 12 having a cavity 14 which has an output end 16 and a back end 18, opposite the output end 16. A partially reflective coupling mirror 20 closes the cavity 14 at its output end 16 and a window 22 closes it at its back end 18. Outside of the back end 18, a photoelastic cell 24 and a high-reflection mirror 26 are further included. As depicted in FIG. 1, the laser 12, the photoelastic cell 24, and the high-reflection mirror 26 are all suitably aligned such that a resonator 28 is defined between the mirrored surfaces of the coupling mirror 20 and the high-reflection mirror 26. In this embodiment both the coupling mirror 20 and the high-reflection mirror 26 are first surface mirrors (which is conventional in most laser practice, but is not the case for all embodiments presented herein).

The cavity 14 contains a gain medium which may be appropriately excited to produce a population inversion such that the laser 12 produces an output beam 30. To create the Zeeman effect, a magnetic field 32 is applied transversely (designated by arrow H in the figures) to a portion of the resonator 28. Preferably, this magnetic field 32 is also applied so that it is oriented with the natural anisotropy of the laser 12.

The photoelastic cell 24 is used to introduce a strong artificial anisotropy into the laser 12, which can either combine with the natural anisotropy or simply overwhelm it (discussed further below). The photoelastic cell 24 exhibits perpendicular privileged directions 34 (directions of principal stress, depicted by arrows F in the figures), and the photoelastic cell 24 is intentionally arranged such that one privileged direction 34 coincides with the direction of the magnetic field 32. In this manner the magnetic field 32 for the transverse Zeeman effect and the artificial anisotropy (and preferably also the natural anisotropy of the laser 12) combine to cause the light produced to have two mutually perpendicular linear polarizations. These orthogonal polarizations then coincide with the privileged directions 34 of the photoelastic cell 24. Lasing of other polarizations are suppressed due to the photoelastic cell 24. The photoelastic cell 24 thus functions somewhat like a Brewster plate, which selects only one linearly polarized electromagnetic wave. Here the photoelastic cell 24 selects two orthogonal linearly polarized components. The frequency split obtained by this process is controllable by the difference in the indexes of refraction for the two privileged directions 34 inside the photoelastic cell 24.

FIG. 2 is a schematic illustrating a second preferred embodiment of the inventive Zeeman laser 10. Here the functions of the window 22, the photoelastic cell 24, and the high-reflection mirror 26 of the embodiment in FIG. 1 are all combined into a photoelastic mirror 36. Assuming that a gas medium such as He-Ne is used, this photoelastic mirror 36 seals the cavity 14 of the laser 12, much as the window 22 does for the above discussed embodiment. However, unlike the high-reflection mirror 26, above, the photoelastic mirror 36 here is a rear surface mirror (one unconventionally mounted backward), to permit light to travel through the birefringent material of the photoelastic mirror 36 before being reflected.

Some advantages of the embodiment of FIG. 2 are that fewer parts are required; the optical alignment and set-up of the parts are easier; and there are fewer index of refraction changes at surfaces, which reduces losses and spurious reflections. However, disadvantages of the embodiment of FIG. 2 are that stress and sealing problems may occur between the back end 18 and the photoelastic mirror 36, and the flatness of the mirrored surface of the photoelastic mirror 36 may change, both due to the application of force in the privileged directions 34.

Figure 3:
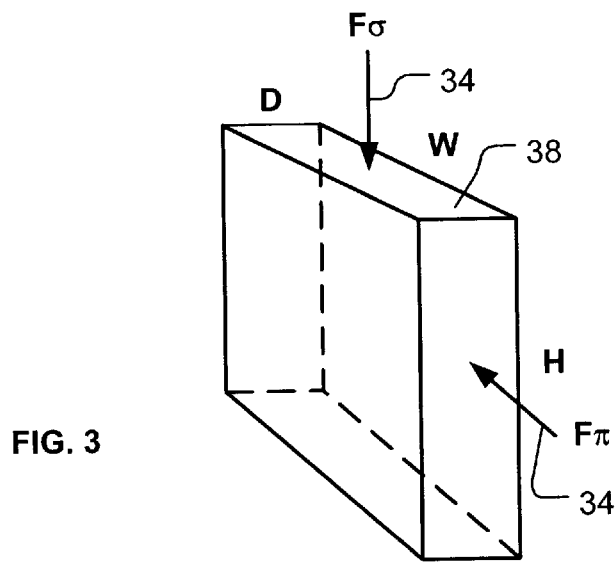
FIG. 3 is a perspective view of a birefringent plate, which may be used as the photoelastic cell of the invention.

FIG. 3 depicts a rectangular photoelastic plate 38, where D, H, and W represent the length, the height, and width. Such a photoelastic plate 38 may be used as the photoelastic cell 24 or in the photoelastic mirror 36.

Assuming the magnetic field 32 to be aligned along the direction of $F_\pi$, as depicted in FIG. 3, if we take $n_\pi$ and $n_\sigma$ to be the indices of refraction for the linear polarizations of the π-component and the σ-component respectively, then the difference between these indices is:

$$n_\pi - n_{94} = C(s_{94} - s_{90}),$$

where $s_{94}$ and $s_{90}$ are the principal stresses at any point, and C is the relative stress-optical constant. For glass, C is about $10^{-8}$ to $10^{-9}$ cm$^2$/kg. If only a force $F_\pi$ (or $F_\sigma$) is applied on the photoelastic plate 38, the π- and σ-components experience different optical paths (L) inside the photoelastic plate 38, due to the difference between the indices. This is described by:

$$\Delta L = L_\pi - L_\sigma = -C(F_{90}/DW)2D = -2(C/W)F_\pi.$$

(Actually ΔL also depends upon the geometry of the photoelastic plate 38 and the uniformity of stress inside it.) This causes the two polarization beams to have slightly different frequencies. The frequency split is:

$$\Delta f = (2/\lambda)(\Delta L) * FSR,$$

where FSR is the free spectral range of the resonator 28 and λ is the wavelength for the laser medium, e.g., He-Ne. Using typical data, such as FSR=1000 MHz and W=3 mm, a 2.5 kg force $F_\pi$ (or $F_\sigma$) can create a beat frequency of 10 MHz.

To create the desired photoelastic effect, birefringence materials like fused silica and optical glass can be used, e.g., BK$_7$. Alternately, the artificial anisotropy and birefringence can also be produced by a Kerr cell or a Pockel cell, even though the Kerr and Pockel coefficients are both very small, about $10^{-12}$ to $10^{-10}$ m/V for the former and about $10^{-18}$ to $10^{-14}$ m$^2$/V$^2$ for the latter in crystals. An optical path difference of λ/2 in a single trip inside a resonator can cause a free spectral range of approximately 1000 MHz. Thus, a few hundred volts of an electrical field may be enough to create a 10 MHz frequency split. Obviously, Kerr or Pockel material should be transparent at the laser wavelength used and its induced loss kept as low as possible.

In FIG. 3 the photoelastic plate 38 is depicted as rectangular because applying force and controlling stresses in such a shape are easier. However, the shape of the component used to create the photoelastic effect and the manner of controlling its magnitude are not limited to the examples provided above. In particular, it should be appreciated that mechanical stretching, electrical and magnetic means, and still other means may be used instead of mechanical pressure. Accordingly, the scope of the present invention should not be interpreted restrictively in these regards.

Figure 4:
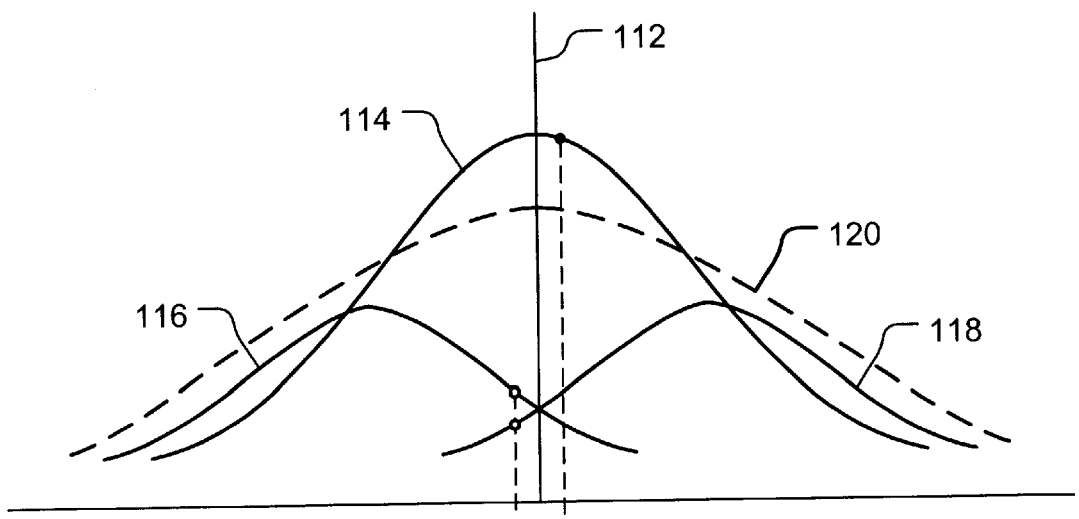
FIG. 4 graphically depicts gain curves for $\pi$ and $\sigma$ components of the invention.

FIG. 4 is a graph depicting the frequency (X-axis) vs. gain (Y-axis) characteristics of the inventive transverse Zeeman laser 10. The laser 12 has an absolute frequency 112 (its natural resonance frequency), about which is centered a π-component gain curve (Δm=0, m being magnetic quantum numbers, here undergoing one of three possible electric dipole transitions). A low σ-component gain curve (Δm=−1) and a high σ-component gain curve (Δm=+1) are symmetrically offset from the absolute frequency 112. A resultant gain curve 120 is also shown, depicting the sum of the σ-components.

By applying the transverse magnetic field 32 to the laser 12 in one of the two privileged directions 34 of the photoelastic cell 24, the σ-curves (116 and 118) are shifted away from the absolute frequency 112 in opposite directions at a rate of 1.8 MHz/Gauss. In contrast, the π-curve 114 (Δm=0) remains centered, the same as in the absence of the external magnetic field 32. Thus, around the absolute frequency 112, the σ-component draws gain from high velocity groups and the π-component from low velocity groups, breaking frequency locking due to weak coupling and causing the frequency difference to be determined only by the optical path difference introduced by the photoelastic cell 24, which, as previously discussed, can be controlled by applying force in the privileged directions 34.

It follows from the above that the resultant gain curve 120 for the σ-components depends upon the strength of the applied magnetic field 32, and therefore the gain for the σ-component is adjustable by changing this. This also means that the gain for the respective σ- and π-components may be different, which is not the case in axial Zeeman He-Ne lasers, where the right-hand and left-hand circularly polarized components always have the same gain. This characteristic of the inventive transverse Zeeman laser 10 therefore provides an additional advantage over axial Zeeman lasers in applications where two orthogonal polarization beams with different intensities are desired.

In addition to the above mentioned examples, various other modifications and alterations of the Zeeman laser 10 may be made without departing from the invention. Accordingly, the above disclosure is not to be considered as limiting and the appended claims are to be interpreted as encompassing the true spirit and the entire scope of the invention.

INDUSTRIAL APPLICABILITY

The inventive transverse Zeeman laser 10 is well suited for a wide variety of applications which currently or potentially use interferometric measurement.

Laser interferometric measurement is a preferred tool, and in some cases the only suitable one, in many widely used industrial processes today. In addition to general machining, some particularly notable examples of this are storage device and semiconductor manufacturing. These require utmost measurement precision and repeatability to achieve desired product features, and they require that this be provided at as high a speed as the underlying industrial processes permit.

However, present laser interferometry techniques are limited in their ability to perform precise and fast measurement simultaneously. Due to the precisely determinable nature of the light frequencies they produce, Zeeman type lasers can be used to perform very accurate measurement. But they are effectively limited today in the maximum speed at which they can perform such measurement. For axial He-Ne gas type Zeeman lasers, which are widely used in industry today, the maximum frequency split obtainable is approximately 4 MHz, and this limits measurement target movement to a maximum of roughly 1.2 m/sec. Non-Zeeman type laser systems exist which can produce light frequencies which are precisely determinable, but these generally produce minimum frequency splits of approximately 40 MHz, making them unsuitable for most applications. The frequency difference is, of course, easily determined interferometrically, but the actual frequencies themselves are not. Thus the limits of present laser interferometers have, in some respects, become obstacles to continued industrial progress.

The inventive transverse Zeeman laser 10 disclosed herein overcomes these limitations of prior laser interferometer systems. It provides multiple frequencies which may be adjustably split across a very wide range. Using largely conventional He-Ne gas laser technology, the invention may provide such frequencies with splits well above 4 MHz. Thus the inventive transverse Zeeman laser 10 eliminates laser interferometry as a limiting obstacle in existing and potential industrial processes.

The inventive transverse Zeeman laser 10 also has a number of advantages for use in existing interferometry applications. Due to its use of the transverse rather than the axial Zeeman effect, it produces light which does not require conversion to orthogonal linear polarizations, as is generally needed in such systems. This means that such systems can be simplified by removing conversion optics. Eliminating conversion also eliminates the loss in light intensity which such causes, and the noise introduced by imperfect conversion. The orthogonal polarization of the frequencies produced by the invention are also adjustable, simplifying system set-up and use. And the ratio of the intensities of the frequencies produced by the invention is also adjustable, unlike predominant systems in current use, e.g., axial Zeeman lasers.

Construction of the inventive transverse Zeeman laser 10 is also well within present industrial capabilities. The laser 12 may be largely conventional. Well understood and widely used He-Ne gas laser technology may be used. The mirrors (20 and 26) may, in general, be conventional. The magnetic field 32 is applied transversely, rather than axially, as is common today. But this is not difficult to accomplish. The only substantially new and unconventional aspects of the invention are the photoelastic unit (24, 36, or 38) and the means to control the photoelastic effect which it produces. Even for this, conventional materials may be used. Birefringent materials and Kerr and Pockel cells are suitable for use in the photoelastic unit (24, 36, or 38). And for control of the photoelastic effect in one or more of the privileged directions 34, force or stress may be applied or relieved using mechanical, electrical, or magnetic means.

For the above, and other, reasons, it is expected that the Zeeman laser 10 of the present invention will have widespread industrial applicability. Therefore, it is expected that the commercial utility of the present invention will be extensive and long lasting.

What is claimed is:

1. A laser, comprising:
   a high-reflection mirror and a coupling mirror defining a resonator;
   a gain medium present in said resonator;
   excitation means to excite said gain medium and produce an output beam from the laser;
   photoelastic means to produce a photoelastic effect introducing an artificial anisotropy into said resonator; and
   magnetic means to apply a magnetic field to said resonator and produce a Zeeman effect; wherein
   said photoelastic means exhibits two privileged directions affecting production of said photoelastic effect; and
   said magnetic means applies said magnetic field transversely along one of said privileged directions and creates two orthogonal linearly polarized frequency components in said output beam with said Zeeman effect.

2. The laser of claim 1, wherein said gain medium is He-Ne gas.

3. The laser of claim 1, wherein said photoelastic means includes a birefringent material.

4. The laser of claim 3, wherein said birefringent material is a member of the set consisting of fused silica and optical glasses.

5. The laser of claim 3, wherein said birefringent material is BK7 optical glass.

6. The laser of claim 1, wherein said photoelastic means includes a Kerr cell.

7. The laser of claim 1, wherein said photoelastic means includes a Pockel cell.

8. The laser of claim 1, wherein:

the laser exhibits a natural anisotropy having a principal axis; and one of said privileged directions of photoelastic means is aligned with said principal axis, to combine said natural anisotropy and said artificial anisotropy.

9. A method for producing a beam of light having two orthogonal linearly polarized frequency components, comprising:

exciting a gain medium in a laser resonator to produce an output beam;

providing a photoelastic effect in said laser resonator to create an artificial anisotropy, wherein said artificial anisotropy has a first principal axis; and applying a magnetic field transversely to said resonator and aligned with said first principal axis.

10. The method of claim 9, further comprising:

controlling the amount of said photoelastic effect to adjust the frequency difference between the frequency components.

11. The method of claim 9, further comprising:

controlling the orientation of application of said photoelastic effect to adjust the orientation of orthogonal polarizations in said output beam.

12. The method of claim 9, further comprising:

controlling the strength of said magnetic field, to adjust where in the gain curves for the gain medium excitation occurs.

13. The method of claim 9, wherein said gain medium is He-Ne gas.

14. The method of claim 9, wherein said photoelastic effect is produced by controlling forces in a birefringent material.

15. The method of claim 9, wherein said photoelastic effect is produced by a Kerr cell.

16. The method of claim 9, wherein said photoelastic effect is produced by a Pockel cell.

17. The method of claim 9, wherein said laser resonator exhibits a natural anisotropy having a second principal axis, the method further comprising:

determining said second principal axis; and aligning said first principal axis with said second principal axis, to combine said natural anisotropy and said artificial anisotropy.

* * * * *